United States Patent [19]

Kuwabara et al.

[11] Patent Number: 4,617,323
[45] Date of Patent: Oct. 14, 1986

[54] PREFOAMED PARTICLES OF CROSSLINKED PROPYLENE-TYPE RESIN AND MOLDED ARTICLE PREPARED THEREFROM

[75] Inventors: Hideki Kuwabara, Hadano; Yoshimi Sudo, Chigasaki; Atusi Kitagawa, Fujisawa, all of Japan

[73] Assignee: Japan Styrene Paper Corporation, Tokyo, Japan

[21] Appl. No.: 700,895

[22] Filed: Feb. 12, 1985

[30] Foreign Application Priority Data

Feb. 13, 1984 [JP] Japan .................................. 59-24607

[51] Int. Cl.[4] .............................................. C08J 9/22
[52] U.S. Cl. .......................................... 521/60; 521/56; 521/58; 521/143
[58] Field of Search ............................. 521/56, 58, 60

[56] References Cited

U.S. PATENT DOCUMENTS

| | | | |
|---|---|---|---|
| 4,379,859 | 4/1983 | Hirosawa et al. | 521/60 |
| 4,399,087 | 8/1983 | Akiyama et al. | 521/60 |
| 4,415,680 | 11/1983 | Ushirokawa | 521/60 |
| 4,436,840 | 3/1984 | Akiyama et al. | 521/60 |
| 4,448,901 | 5/1984 | Senda et al. | 521/60 |
| 4,464,484 | 8/1984 | Yoshimura et al. | 521/60 |
| 4,504,534 | 3/1985 | Adachi et al. | 521/60 |

Primary Examiner—Morton Foelak
Attorney, Agent, or Firm—Sherman and Shalloway

[57] ABSTRACT

Prefoamed crosslinked propylene-type resin particles prepared by using as a base resin a propylene random copolymer whose amount of heat of crystallization determined by a DSC method is 19 to 10 cal/g. The prefoamed particles have a gel fraction of 1 to 65%. Also provided is a molded article of a crosslinked propylene-type resin which is a fused aggregate of the aforesaid prefoamed particles in which the number of cells, N per mm$^2$, and the density, d (g/cm$^3$), have the relation represented by the expression $2 < N^{\frac{1}{2}}/d^{\frac{1}{3}} < 45$.

4 Claims, No Drawings

PREFOAMED PARTICLES OF CROSSLINKED PROPYLENE-TYPE RESIN AND MOLDED ARTICLE PREPARED THEREFROM

This invention relates to prefoamed cross-linked propylene-type resin particles, and a molded article prepared therefrom.

Generally, propylene-type resins have superior thermal and chemical resistances and high mechanical strength, higher flexibility than polystyrene and higher rigidity than polyethylene. The present inventors previously succeeded in developing prefoamed non-crosslinked propylene-type resin particles and a molded article ("molded article" in this specification means an article obtained by filling prefoamed particles into a mold capable of enclosing the particles but allowing escape of gases therefrom, and heating the particles to expand them to the configuration of the mold) having superior properties produced by foaming these prefoamed particles under heat in a mold. It is not always easy, however, to obtain prefoamed non-crosslinked propylene-type resin particles having a uniform expansion ratio stably because the non-crosslinked structure of the propylene-type resin results in abrupt changes in viscoelasticity at temperatures in the vicinity of the foaming temperature. Accordingly, the above prior technique leaves room for improvement. If prefoamed particles having greatly varying expansion ratios are used in fabrication within mold, the cushioning properties of the resulting molded articles vary, and also the foamed articles become, or tend to become, open-cellular so that it is difficult to obtain stable properties. Moreover, the non-crosslinked articles are still desired to be improved in regard to compression set, dimensional change upon heating, compression hardness, etc.

Extensive investigations made by the present inventors in view of the above state of the art have now led to the discovery that prefoamed particles having a gel fraction of 1 to 65% prepared by using a specific crosslinked random propylene as a base resin, and a molded article prepared from the prefoamed particles have improved properties.

According to this invention, there are provided prefoamed crosslinked propylene-type resin particles prepared by using as a base resin a propylene random copolymer whose amount of heat of crystallization determined by a DSC method is 19 to 10 cal/g, said prefoamed particles having a gel fraction of 1 to 65%.

There is also provided a molded article of a cross-linked propylene-type resin which is a fused aggregate of the aforesaid prefoamed particles wherein the number of cells, N per mm$^3$, and the density, d (g/cm$^3$), have the relation represented by the expression $2 < N^{\frac{1}{3}}/d^{\frac{1}{3}} < 45$.

Examples of the propylene random copolymer whose amount of heat of crystallization determined by a DSC method is 19 to 10.0 cal/g are an ethylene/propylene random copolymer and ethylene/propylene/1-butene random copolymer. The ethylene/propylene random copolymer produces a particularly excellent effect.

The amount of heat of crystallization of the base resin used in this invention is 19 to 10 cal/g, preferably 17.5 to 10 cal/g. The use of a propylene random copolymer whose amount of heat of crystallization is larger than 19 cal/g reduces the post-expanding ability of the prefoamed particles during fabrication in a mold and leads to the necessity of using high vapor pressures for molding, and moreover give brittle molded articles. If the amount of heat of crystallization is smaller than 10 cal/g, the resulting prefoamed particles and a molded article obtained by molding the prefoamed particles in a mold have reduced rigidity.

The amount of heat of crystallization can be determined by the DSC method as follows: By using a differential scanning calorimeter, about 6 mg of the sample is put in an aluminum cell, crimped, heated to 220° C. at a rate of 10° C./min. and thereafter cooled to about 50° C. at a rate of 10° C./min. in nitrogen gas. The amount of heat of crystallization is calculated from the resulting thermogram.

In the propylene random copolymer of this invention, the proportions of propylene and another olefin are preferably such that it comprises 90 to 99% by weight of the propylene component and 1 to 10% by weight of the other olefin component. If the proportion of the propylene component is less than 90% by weight, rigidity and strength characteristics of the propylene resin are reduced. If the other olefin is, for example, ethylene, the properties of the resulting copolymer are undesirably close to those of low-density polyethylene. On the other hand, if the proportion of the other olefin component is less than 1% by weight, the effect of modification is small.

The prefoamed particles and the molded article of this invention are composed of a resin obtained by crosslinking the propylene random copolymer as a base resin. When a crosslinked resin mixture is used as the base resin, it may be a mixture of the crosslinked propylene random copolymer and a crosslinked or non-crosslinked other resin. Or it may be a mixture obtained by mixing the propylene random copolymer and another resin and crosslinking the mixture. Examples of the other resin, crosslinked or non-crosslinked, include rubbers such as ethylene/propylene rubber and ethylene/1-butene rubber; polyethylenes such as low-density polyethylene, high-density polyethylene and linerar low-density polyethylene; thermoplastic elastomers; propylene homopolymer, propylene/ethylene block copolymer; and mixtures of these. Preferably, the proportion of the other resin is not more than 50% by weight.

The prefoamed particles and the molded article of this invention comprise the foresaid crosslinked propylene random copolymer, and have a gel fraction of 1 to 65%.

The gel fraction of the molded article is determined as follows: A portion of the molded article is boiled for 8 hours in boiling xylene. The xylene-insoluble portion obtained at this time is dried at a temperature of 80° C. under a reduced pressure of 2 mmHg or below for 8 hours. The percentage of the dry weight based on the weight of the sample before boiling is defined as the gel fraction.

The gel fraction of the prefoamed particles denotes that of aged prefoamed particles obtained by leaving the prefoamed particles to stand under atmospheric pressure thereby substituting air for the blowing agent contained in them, and is determined in the same way as described above for the molded article by using such aged prefoamed particles. The gel fraction of the prefoamed particles remains unchanged even when they have been expanded and fused under heat in a mold to produce a fushed aggregate, namely a molded article.

Prefoamed particles having a gel fraction over 65% have poor post-expanding ability, and the state of fusion of the prefoamed particles to one another in the resulting molded article becomes poor, and the molded article has a high water absorption. Furthermore, the surface of the molded article is remarkably uneven. On the other hand, if the gel fraction is less than 1%, the resulting molded article has the same defects as a molded article obtained from a non-crosslinked propylene random copolymer.

Preferably, the prefoamed particles of this invention have the following relation $$2 < E^{\frac{1}{3}} \times n^{\frac{1}{2}} < 45$$

wherein E is the true expansion ratio of the prefoamed particles and n is the average number of cells per mm$^2$ of cross section.

Prefoamed particles having an $E^{\frac{1}{3}} \times n^{\frac{1}{2}}$ value of 2 or less give an in-mold foamed article having coarse cells, and the state of fusion of the particles to one another is not good. Prefoamed particles having an $E^{\frac{1}{3}} \times n^{\frac{1}{2}}$ value of 45 or more tend to shrink during fabrication in a mold, and moreover causes a decrease in the proportion of closed cells. The true expansion ratio of the prefoamed particles, E, can be determined by putting prefoamed particles of a known weight in a fixed amount of water in a measuring cylinder, measuring the entire volume of the contents of the cylinder, subtracting the volume of water from the entire volume of the contents to calculate the volume of the prefoamed particles and dividing the weight of the prefoamed particles by their volume. The average number of cells, n, can be determined by observing the cross section of the prefoamed particles under a microscope, measuring the number of cells per mm$^2$, and averaging the results.

Preferably, the prefoamed particles of the invention have an internal pressure decreasing speed coefficient, k, at 25° C. and 1 atm. of K≦0.30 (1/hr). Prefoamed particles having a k of more than 0.30 (1/hr) tend to give resulting molded article which has large shrinkage with respect to the mold, and is brittle.

The internal pressure decreasing speed coefficient, k, denotes the coefficient of the speed at which the internal pressure of the prefoamed particles decreases at 25° C. by the escaping of air from their inside when an internal pressure of 2 to 5 kg/cm$^2$-G has been applied to the prefoamed particles with air. It is determined by the following method.

Prefoamed particles having a known expansion ratio and weight are filled in a polyethylene bag having a size of, for example, 70 mm×100 mm, and containing numerous pinholes. While maintaining a temperature of 25° C., a pneumatic pressure is applied to impart an internal pressure of 2 to 5 kg/cm$^2$-G to the prefoamed particles. Then, the weight of the prefoamed particles is measured. The prefoamed particles are then maintained at a temperature of 25° C. and a pressure of 1 atm., and after the lapse of 10 minutes, the weight of the prefoamed particles is measured. The internal pressure, $P_o$ (kg/cm$^2$-G), of the prefoamed particles immediately after application of the internal pressure and the internal pressure, $P_1$ (kg/cm$^2$-G), of the prefoamed particles after they have been maintained for 10 minutes at 25° C. and 1 atm. are calculated in accordance with the following equation.

$$\text{Internal pressure of the prefoamed particles (kg/cm}^2\text{-G)} = \frac{\text{Weight of air increased} \times 0.082 \times T(K) \times 1.0332 \text{ (g)}}{\text{Molecular weight of air} \times \text{Volume of air within the particles (l)}}$$

The weight of air increased is the difference between the weight of the particles at the time of measuring their internal pressure and the weight of the particles before the pressurizing treatment. T is the temperature of the atmosphere. The volume of air within the particles is calculated from the expansion ratio of the foamed particles.

The internal pressure decreasing speed coefficient, k, is calculated in accordance with the following equation using $P_o$ and $P_1$ determined as above.

$$k(1/\text{hr}) = -\frac{1}{t} \log \frac{P_1}{P_0}$$

wherein t is the time in hours, and in the above case, t is 1/6.

The foamed condition of the molded article of this invention, namely a fused aggregate of the prefoamed particles, is such that the average number of cells per mm$^2$ of cross section (N/mm$^2$) and the density of the molded article (d in g/cm$^3$) have the relation represented by the expression $2 < N^{\frac{1}{2}}/d^{\frac{1}{3}} < 45$. If $N^{\frac{1}{2}}/d^{\frac{1}{3}}$ is 2 or less, the surface of the molded article is harder than is necessary, and the fused condition of the prefoamed particles is poor. Consequently, the various properties of the molded article will be undesirably deteriorated. If, on the other hand, $N^{\frac{1}{2}}/d^{\frac{1}{3}}$ is at least 45, the resulting molded article is brittle and susceptible to breakage and develops creases on its surface.

The average number of cells, N, is determined by observing the cross section of the molded article under a microscope, measuring the number of cells per mm$^2$ of the cross section, and averaging the results.

One example of the production of a molded article from the prefoamed particles of the invention will be described below with reference to the case of using a propylene random copolymer alone as a base resin.

Crosslinked resin particles are produced by suspending 100 parts by weight of particles of the propylene random copolymer, 0.05 to 5 parts by weight of an organic peroxide as a crosslinking agent, 0.01 to 10 parts by weight of a dispersant, and 0.05 to 5 parts by weight of divinylbenzene in water, and heating the aqueous suspension to a temperature at which the resin particles are impregnated with the crosslinking agent and divinylbenzene and crosslinked. Alternatively, they can be obtained by kneading 0.2 to 1 part by weight of p,p'-dibenzoyl quinonedioxime into 100 parts by weight of the propylene random copolymer at a temperature below the decomposition temperature of p,p'-dibenzoyl quinonedioxime, then converting the mixture into particles, introducing 100 parts by weight of the resulting particles, 0.05 to 5 parts by weight of a crosslinking agent and 0.01 to 10 parts by weight of a dispersing agent into a closed vessel, and heating the mixture with stirring to a temperature at which the resin particles are impregnated with the crosslinking agent and crosslinked.

Prefoamed particles are produced by dispersing 100 parts by weight of the crosslinked propylene random copolymer particles obtained as above, 5 to 50 parts of a blowing agent and 0.1 to 10 parts by weight of a dispersing agent in a dispersion medium such as water in a closed vessel, heating the mixture with stirring to impregnate the copolymer particles with the blowing agent, opening one end of the vessel while the pressure of the inside of the vessel is maintained constant by using nitrogen gas or the like at a predetermined temperature, and releasing the copolymer particles and the dispersion medium into an atmosphere (usually under atmospheric pressure) having a lower pressure than the pressure of the inside of the vessel, thereby expanding the copolymer particles. The gel fraction of the prefoamed particles can be adjusted to a suitable value within the range of 1 to 65% by adjusting the amounts of the crosslinking agent and the crosslinking aid during the crosslinking. As stated hereinabove, the gel fraction of the prefoamed particles still remains unchanged even when they have been foamed and fused under heat within a mold to produce a molded article.

The blowing agent used in the prefoaming is usually a volatile organic blowing agent. Examples include aliphatic hydrocarbons such as propane, butane, pentane, hexane and heptane; cycloaliphatic hydrocarbons such as cyclobutane and cyclopentane; and halogenated hydrocarbons such as trichlorofluoromethane, dichlorodifluoromethane, dichlorotetrafluoroethane, methyl chloride, ethyl chloride and methylene chloride. These blowing agents may be used as a mixture. The amount of the blowing agent used is about 0.04 to 0.20 mole per 100 g of the propylene-type resin particles. An inorganic blowing agent such as carbon dioxide may also be used either alone or with the organic blowing agent. The amount of the inorganic blowing agent added is 5 to 50 parts by weight per 100 parts by weight of the copolymer particles. When the inorganic blowing agent is used for the foaming of a non-crosslinked propylene-type resin, the resulting cells tend to become small. But when it is used for the expanding of a crosslinked propylene random copolymer, there is no likelihood of the cells becoming too small.

Illustrative of the dispersing agent are fine particulate aluminum oxide, titanium oxide and basic zinc carbonate. Its amount is generally 0.1 to 10 parts by weight per 100 parts by weight of the copolymer particles.

The expanding temperature at which the copolymer particles are prefoamed by releasing them from the closed vessel is preferably at least $Tm-10$ (°C) in which Tm is the temperature at which the propylene random copolymer particles before crosslinking have been melted. (Tm is determined as follows: By using a differential scanning calorimeter, the sample (6 to 8 mg) is heated to 220° C. at a rate of 10° C./min., then cooled to about 40° C. at a rate of 10° C./min., and again heated to 220° C. at a rate of 10° C./min. Tm is defined as the temperature at which the bottom of the endothermic peak of the DSC curve obtained by the second temperature elevation has returned to the position of the base line on a higher temperature side.) If the foaming temperature is below $Tm-10$ (°C.), prefoamed particles cannot be obtained, or prefoamed particles having a nonuniform expansion ratio are obtained.

The prefoamed particles can be further expanded in order to increase their expansion ratio. This may be effected by a method which comprises pressurizing the prefoamed particles obtained as above with an inorganic gas such as air or nitrogen and/or the volatile blowing agent described above to apply an internal pressure higher than the atmospheric pressure, and thereafter heating the prefoamed particles at a temperature above their softening temperature. This additional expanding step may be repeated a plurality of times.

The prefoamed particles of this invention obtained as above usually have an apparent expansion ratio of 3 to 100.

The molded article of the invention can be obtained by filling the prefoamed particles having imparted thereto post-expanding ability in a mold, and molding them under heat.

Since the prefoamed crosslinked propylene-type resin particles of the invention are produced by using as a base resin the propylene random copolymer whose amount of heat of crystallization is 19 to 10 cal/g and by the crosslinking of the base resin, the gel fraction of the prefoamed particles or the foamed article is adjusted to 1 to 65%, the prefoamed particles have excellent post-expanding ability and can be easily molded within a mold without the need to supply steam having so high a pressure.

The molded article finally obtained from the prefoamed particles of this invention shows excellent fusion among the particles, is free from surface unevenness, and has excellent strength and rigidity.

The following Examples and Comparative Examples illustrate the present invention in more detail.

All parts in these examples are by weight.

EXAMPLES 1-3 AND COMPARATIVE EXAMPLE 1

One hundred parts of particles of ethylene/propylene random copolymer (Tm=155° C.) having an amount of heat of crystallization of 15.5 cal/g, 0.3 part of fine particulate aluminum oxide as a dispersing agent and each of the crosslinking agents and crosslinking aids shown in Table 1 in the amounts indicated were suspended in 300 parts of water (p,p'-dibenzoyl quinonedioxime had been incorporated in the resin particles beforehand). The suspension was heated to 100° C. with stirring, and maintained at this temperature for 1 hour. Furthermore, it was maintained at each of the temperatures indicated in Table 1 for each of the periods of time indicated in Table 1 to crosslink the polymer particles.

A closed vessel was then charged with 100 parts of the crosslinked resin particles, 300 parts by weight of water, 0.3 part of fine particulate aluminum oxide and 17 parts of dichlorodifluoromethane. With stirring, these materials were heated to each of the temperatures shown in Table 1 to impregnate the resin particles with the blowing agent. At the same temperature, one end of the vessel was opened while maintaining the internal pressure of the vessel at 30 kg/cm$^2$-G with nitrogen gas, and the resin particles and water were released into the open atmosphere. Thus, the resin particles were expanded to give prefoamed resin particles. The gel fraction and the internal pressure reducing speed coefficient k of the resulting prefoamed particles are shown in Table 1. Table 1 also shows the $E^{\frac{1}{3}} \times n^{\frac{1}{3}}$ value of the prefoamed particles calculated from the true expansion ratio E and the number of cells per mm$^2$.

The prefoamed particles were then pressurized with air to impart an internal pressure of 1.5 kg/cm$^2$-G, then filled in a mold having an inside size of 300 mm × 300 mm × 50 mm, and heated with steam under 3.3 kg/cm$^2$-G to expand and fuse them to one another and to obtain a molded article. The properties of the molded article are shown in Table 2.

Comparative Example 1 shows the production of prefoamed particles having a gel fraction and an $E^{\frac{1}{2}} \times n^{\frac{1}{2}}$ value outside the scope of this invention, and an in-mold foamed article prepared therefrom. The results are also shown in Tables 1 and 2.

COMPARATIVE EXAMPLE 2

The same ethylene/propylene random copolymer particles as used in Examples 1 to 3 were not crosslinked but directly expanded by the same method as described in Examples 1 to 3 to form prefoamed particles. The properties of the prefoamed particles are also shown in Table 1. The prefoamed particles were then molded with steam under a pressure of 4 kg/cm$^2$-G (which is industrially feasible) in the same way as in Examples 1 to 3 to obtain a molded article. The properties of the molded article are also shown in Table 2.

EXAMPLES 4–7 AND COMPARATIVE EXAMPLES 3–4

One hundred parts of the resin particles indicated in Table 3, 0.48 part of dicumyl peroxide as a crosslinking agent and 0.6 part of divinylbenzene as a crosslinking aid were suspended in 300 parts of water. The suspension was heated to 100° C. with stirring and maintained at this temperature for 1 hour. Then, it was heated to 150° C. and maintained for 1 hour to crosslink the resin particles. The crosslinked resin particles were expanded in the same way as in Examples 1 to 3 using each of the blowing agents indicated in Table 3 to obtain prefoamed particles. The properties of the prefoamed particles are shown in Table 3.

The prefoamed particles were then molded in the same way as in Examples 1 to 3 to obtain a molded article. The properties of the molded article are shown in Table 4.

Comparative Examples 3 and 4 show the use of resin particles having the amount of heat of crystallization outside the scope of the invention. The results are also shown in Tables 3 and 4.

As a reference, the properties of a molded article of crosslinked low-density polyethylene (Mirablock, a brand name for a product of Japan Styrene Paper Co., Ltd.) are also shown in Table 4.

EXAMPLES 8–10

One hundred parts of mixed resin particles having each of the compositions indicated in Table 5, 0.3 part of fine particulate aluminum oxide and each of the crosslinking agents and crosslinking aids shown in Table 5 in the amounts indicated were suspended in 300 parts of water. The suspension was maintained at 100° C. for 1 hour, and further maintained for 1 hour at each of the temperatures indicated in Table 5 to crosslink the resin particles. The crosslinked resin particles were expanded in the same way as in Examples 1 to 3 to obtain prefoamed particles. The properties of the resulting prefoamed particles are also shown in Table 5.

The prefoamed particles were molded in the same way as in Examples 1 to 3 to obtain a molded article. The properties of the molded article are shown in Table 6.

TABLE 1

| | | Crosslinking conditions | | | | Expanding temperature (°C.) | Prefoamed particles | | | Expansion ratio (E) |
|---|---|---|---|---|---|---|---|---|---|---|
| | | Crosslinking agent | | Crosslinking aid | | Temperature (°C.) | | | | |
| | | Type | Amount (parts) | Type | Amount (parts) | | Gel fraction (%) | k (1/hr) | $E^{\frac{1}{2}} \times n^{\frac{1}{2}}$ value | |
| Example | 1 | Dicumyl peroxide | 0.48 | p,p'-Dibenzoyl quinoneoxime | 0.3 | 150 × 1 hr | 150 | 5 | 0.28 | 3 | 19.4 |
| | 2 | Dicumyl peroxide | 0.48 | Divinylbenzene | 0.3 | 140 × 3 hr | 152 | 30 | 0.18 | 10 | 20.0 |
| | 3 | Dicumyl peroxide | 0.48 | Divinylbenzene | 2.0 | 150 × 1 hr | 152 | 45 | 0.21 | 40 | 18.8 |
| Comparative Example | 1 | Dicumyl peroxide | 0.48 | p,p'-Dibenzoyl quinoneoxime | 0.9 | 160 × 30 min | 153 | 68 | 0.31 | 50 | 20.6 |
| | 2 | — | — | — | — | — | 145 | 0 | 0.22 | 15 | 18.8 |

TABLE 2

| | | Dimensional accuracy (*1) | Dimensional change upon heating (%) (*2) | Compression hardness (g/cm$^2$-G) (*3) | Compression set (%) (*4) | Water absorption (*5) | Surface condition (*6) | Expansion ratio of the foamed article |
|---|---|---|---|---|---|---|---|---|
| Example | 1 | O | −2.0 | 1.2 | 7.0 | O | O | 30 |
| | 2 | O | −1.5 | 1.3 | 5.5 | O | O | 31 |
| | 3 | O | −1.2 | 1.3 | 5.0 | O | O | 30 |
| Comparative Example | 1 | Δ | −1.2 | 1.3 | 8.8 | X | X | 32 |
| | 2 | O | −2.6 | 1.2 | 9.0 | O | O | 30 |

TABLE 3

| | | Propylene random copolymer | | Blowing agent | | Expanding temperature (°C.) | Prefoamed particles | | | Expansion ratio (E) |
|---|---|---|---|---|---|---|---|---|---|---|
| | | Type(*) | Tm (°C.) | Type | Amount (parts) | | Gel fraction (%) | k (1/hr) | $E^{\frac{1}{2}} \times n^{\frac{1}{2}}$ value | |
| Example | 4 | Ethylene/propylene random copolymer (18.9 cal/g) | 165 | Dichlorodifluoromethane | 15 | 165 | 29 | 0.28 | 25 | 19.4 |
| | 5 | Ethylene/propylene | 158 | Dichlorodifluoro- | 10 | 155 | 35 | 0.23 | 30 | 20.0 |

TABLE 3-continued

| | | Propylene random copolymer | | Blowing agent | | Expanding temperature (°C.) | Prefoamed particles | | | Expansion ratio (E) |
|---|---|---|---|---|---|---|---|---|---|---|
| | | Type(*) | Tm (°C.) | Type | Amount (parts) | | Gel fraction (%) | k (1/hr) | $E^{\frac{1}{3}} \times n^{\frac{1}{2}}$ value | |
| | | random copolymer (18.4 cal/g) | | methane & carbon dioxide | 5 | | | | | |
| | 6 | Ethylene/propylene random copolymer (15.5 cal/g) | 153 | carbon dioxide | 12 | 160 | 40 | 0.21 | 35 | 18.1 |
| | 7 | Propylene/1-butene random copolymer (12.3 cal/g) | 155 | Dichlorodifluoromethane | 15 | 150 | 39 | 0.18 | 10 | 18.9 |
| Comparative Example | 3 | Propylene/1-butene random copolymer (8.9 cal/g) | 145 | Dichlorodifluoromethane | 16 | 145 | 38 | 0.23 | 15 | 18.8 |
| | 4 | Ethylene/propylene random copolymer (20 cal/g) | 165 | Dichlorodifluoromethane | 16 | 165 | 25 | 0.28 | 35 | 17.5 |

(*)The parenthesized figures show the amount of heat of crystallization

TABLE 4

| | | Dimensional accuracy (*1) | Compression hardness (g/cm²-G) (*3) | Compression set (%) (*4) | Water absorption (*5) | Surface condition (*6) | Expansion ratio | Fused condition (*7) |
|---|---|---|---|---|---|---|---|---|
| Example | 4 | ○ | 1.8 | 7.6 | ○ | ○ | 31 | Δ |
| | 5 | ○ | 1.6 | 6.2 | ○ | ○ | 31 | ○ |
| | 6 | ○ | 1.2 | 5.6 | ○ | ○ | 29 | ○ |
| | 7 | ○ | 0.8 | 4.2 | ○ | ○ | 30 | ○ |
| Comparative Example | 3 | Δ | 0.7 | 5.1 | ○ | ○ | 30 | ○ |
| | 4 | ○ | 1.8 | 8.3 | ○ | ○ | 28 | X |
| Reference | | Δ | 0.65 | 3.9 | ○ | ○ | 26 | ○ |

TABLE 5

| | | | | Crosslinking Conditions | | | | | | | |
|---|---|---|---|---|---|---|---|---|---|---|---|
| | Resin composition | | Crosslinking agent | | Crosslinking aid | | Temperature (°C.) | Prefoamed particles | | | Expansion ratio (E) | Expanding temperature (°C.) |
| Example | Type(*) | Amount (wt. %) | Type | Amount (parts) | Type | Amount (parts) | | Gel fraction (%) | k (1/hr) | $E^{\frac{1}{3}} \times n^{\frac{1}{2}}$ value | | |
| 8 | Ethylene/propylene random copolymer (15.5 cal/g) | 70 | Dicumyle perpxide | 0.48 | Divinylbenzene | 0.8 | 150 | 43 | 0.23 | 18 | 17.5 | 150 |
| | Ethylene/propylene rubber | 30 | | | | | | | | | | |
| 9 | Ethylene/propylene random copolymer (15.5 cal/g) | 90 | Dicumyl peroxide | 0.48 | Divinylbenzene | 0.6 | 150 | 38 | 0.26 | 10 | 15.6 | 150 |
| | High-density polyethylene | 10 | | | | | | | | | | |
| 10 | Propylene/1-butene random copolymer (14.5 cal/g) | 90 | Dicumyl peroxide | 0.48 | Divinylbenzene | 0.6 | 150 | 36 | 0.20 | 25 | 21.1 | 160 |
| | Ethylene/propylene block copolymer having an ethylene content 20 wt. % | 10 | | | | | | | | | | |

(*)The parenthesized figures show the amount of heat of crystallization.

TABLE 6

| Example | Dimensional accuracy (*1) | Compression hardness (g/cm²-G) (*3) | Compression set (%) (*4) | Water absorption (*5) | Surface condition (*6) | Expansion ratio |
|---|---|---|---|---|---|---|
| 8 | ○ | 0.7 | 2.9 | ○ | ○ | 28 |
| 9 | ○ | 1.0 | 5.8 | ○ | ○ | 24 |
| 10 | ○ | 0.9 | 6.0 | ○ | ○ | 33 |

(*1): Dimensional accuracy
Evaluated as follows by the shrinkage of a
molded article molded in a mold having an inside size of
300 mm × 300 mm × 50 mm, with respect to the planar
direction of the mold.

TABLE 6-continued

O: the shrinkage is less than 3%
Δ: the shrinkage is 3 to less than 4%
X: the shrinkage is at least 4%
(*2): Dimensional change upon heating
Measured at 110° C. in accordance with JIS
K-6767.
(*3): Compression hardness
Measured in accordance with JIS K-6767.
(*4): Compression set
Measured in accordance with JIS K-6767.
(*5): Water absorption
Measured in accordance with JIS K-6767B, and
evaluated as follows:
O: the water absorption is less than 0.003 g/cm$^2$
Δ: the water absorption is from 0.003 to less than 0.03 g/cm$^2$
X: the water absorption is at least 0.03 g/cm$^2$
(*6): Surface condition
The surface of the molded article is observed,
and the surface condition is evaluated as follows:
O: the surface is smooth with very little
unevenness
X: the surface has poor smoothness with great
unevenness
(*7): Fused condition
The molded article is broken by pulling, and
the fractured condition of its fractured surface is
observed. The fused condition is evaluated as follows:
X: at least 70% of the article is broken among
the particles
(not acceptable)
Δ: less than 70% to 40% of the article is
broken among the particles
(acceptable without any particular problem)
O: less than 40% of the article is broken
among the particles
(acceptable with no problem)

EXAMPLES 11-16 AND COMPARATIVE EXAMPLES 5-8

A closed vessel was charged with 100 parts of particles of each of the ethylene/propylene random copolymers shown in Table 7, 300 parts of water, 0.3 part of fine particulate aluminum oxide, and each of the crosslinking agents and crosslinking aids shown in Table 7, and with stirring, these materials were maintained at 100° C. for 1 hour. Then, the suspension was further maintained at 150° C. for 1 hour to crosslink the copolymer particles. The gel fraction of the resulting crosslinked resin particles is shown in Table 7. When p,p'-dibenzoyl quinonedioxime was used as the crosslinking aid, it was kneaded into the resin particles before charging into the closeed vessel.

One hundred parts of the resulting crosslinked resin particles, 300 parts of water, 0.3 part of fine particulate aluminum oxide and each of the blowing agents indicated in Table 7 were blended in a closed vessel, and with stirring, the mixture was heated to each of the temperatures shown in Table 7 to impregnate the resin particles with the blowing agent. Then, one end of the closed vesssel was opened, and the resin particles and the dispersion medium were released into the open atmosphere to obtain prefoamed resin particles. The expansion ratio and the number of cells of the resulting prefoamed resin particles were measured, and are shown in Table 7.

The prefoamed resin particles were pressurized with air to impart an internal pressure of 1.5 kg/cm$^2$-G to the particles, filled in a mold, and molded by heating them with steam under a pressure of 2.5 to 4 kg/cm$^2$-G. The resulting molded article was aged in an oven at 80° C. for 24 hours, and then the shrinkage, flexibility, surface condition, surface protecting property, dimensional change upon heating, compression hardness and compression set of the molded article were measured. The results are shown in Table 8.

Comparative Examples 5 to 8 were outside the scope of the invention in respect of the olefin component (No. 5), gel fraction (No. 6) and N$^{\frac{1}{2}}$/d$^{\frac{1}{2}}$ value (Nos. 7 and 8). The results are shown in Tables 7 and 8.

Table 8 also shows the properties of non-crosslinked expanded articles obtained from the materials used in Examples 12 and 13 (Comparative Examples 9 and 10). These results demonstrate the superiority of the crosslinked expanded articles to the non-crosslinked expanded articles in respect of dimensional change upon heating, compression hardness and compression set.

TABLE 7

| | | Ethylene propylene random copolymer | | Crosslinking conditions | | | | |
|---|---|---|---|---|---|---|---|---|
| | | Ethylene content (wt. %) | Amount of heat of crystallization (cal/g) | Crosslinking agent | | Crosslinking aid | | Gel fraction (%) |
| | | | | Type | Amount (parts) | Type | Amount (parts) | |
| Example | 11 | 1.5 | 17.2 | Dicumyl peroxide | 0.48 | Divinylbenzene | 0.15 | 25 |
| | 12 | 2.8 | 16.8 | " | 0.68 | Divinylbenzene | 0.2 | 33 |
| | 13 | 4.2 | 15.8 | " | 0.72 | Divinylbenzene | 0.2 | 35 |
| | 14 | 4.2 | 15.8 | " | 0.48 | p,p'-Dibenzoyl quinonedioxime | 0.3 | 5 |
| | 15 | 4.2 | 15.8 | " | 0.48 | p,p'-Dibenzoyl | 0.8 | 60 |

TABLE 7-continued

|  |  |  |  |  |  |  |  |  |
|---|---|---|---|---|---|---|---|---|
|  | 16 | 5.3 | 11.0 | " | 0.48 | quinonedioxime Divinylbenzene | 0.5 | 41 |
| Comparative | 5 | 0.8 | 17.8 | " | 0.48 | Divinylbenzene | 0.3 | 30 |
| Example | 6 | 4.2 | 15.8 | " | 0.48 | p,p'-Dibenzoyl quinonedioxime | 0.9 | 70 |
|  | 7 | 4.2 | 15.8 | " | 0.72 | Divinylbenzene | 0.2 | 35 |
|  | 8 | 4.2 | 15.8 | " | 0.72 | Divinylbenzene | 0.2 | 35 |
|  | 9 | 2.8 | 16.8 | — | — | — | — | — |
|  | 10 | 4.2 | 15.8 | — | — | — | — | — |

|  |  | Blowing agent | | Expanding temperature (°C.) | Prefoamed particle | | $E^{\frac{1}{3}} \times n^{\frac{1}{3}}$ value |
|---|---|---|---|---|---|---|---|
|  |  | Type | Amount (parts) |  | Expansion ratio (E) | Number of cells (n) |  |
| Example | 11 | Dichlorodifluoro-methane | 18 | 160 | 25 | 26 | 15 |
|  | 12 | Carbon dioxide | 10 | 155 | 19 | 260 | 43 |
|  | 13 | Dichlorodifluoro-methane & carbon dioxide | 10 5 | 150 | 17 | 94 | 25 |
|  | 14 | Dichlorodifluoro-methane & trichlorofluoromethane | 10 10 | 150 | 28 | 24 | 15 |
|  | 15 | Dichlorodifluoro-methane & trichlorofluoromethane | 8 8 | 157 | 22 | 11 | 3 |
|  | 16 | Dichlorodifluoro-methane & carbon dioxide | 10 5 | 145 | 9 | 208 | 30 |
| Comparative Example | 5 | Dichlorodifluoro-methane | 16 | 155 | 19 | 88 | 25 |
|  | 6 | Dichlorodifluoro-methane | 18 | 150 | 19 | 224 | 40 |
|  | 7 | Dichlorodifluoro-methane | 20 | 148 | 25 | 292 | 50 |
|  | 8 | Dichlorodifluoro-methane & trichlorofluoromethane | 8 8 | 155 | 22 | 0.29 | 1.5 |
|  | 9 | — | — | — | — | — | — |
|  | 10 | — | — | — | — | — | — |

TABLE 8

|  |  | Expansion ratio | Number of cells (N) | $N^{\frac{1}{3}}/d^{\frac{1}{3}}$ | Dimensional accuracy (*8) | Flexibility (*9) | Surface condition (*10) | Dimensional change upon heating (*11) | Compression hardness (*12) | Surface protectability (*13) | Compression set (*14) | Overall-evaluation (*15) |
|---|---|---|---|---|---|---|---|---|---|---|---|---|
| Example | 11 | 40 | 19 | 15.4 | O | O | O | −0.8 | 2.0 | O | O | O |
|  | 12 | 30 | 191 | 44.5 | O | O | O | −1.3 | 1.8 | O | O | O |
|  | 13 | 27 | 69 | 25.8 | O | O | O | −1.5 | 1.4 | O | O | O |
|  | 14 | 45 | 18 | 15.6 | O | O | O | −2.0 | 0.8 | O | O | O |
|  | 15 | 35 | 0.84 | 3.1 | O | O | O | −1.5 | 1.3 | O | O | O |
|  | 16 | 15 | 148 | 31 | O | O | O | −2.0 | 2.6 | O | O | O |
| Comparative Example | 5 | 30 | 15 | 25.9 | O | X | O | −0.5 | 2.0 | O | O | X |
|  | 6 | 30 | 166 | 41.5 | O | O | X | −1.5 | 1.4 | O | O | X |
|  | 7 | 38 | 221 | 51.8 | X | Δ | O | −3.1 | 0.8 | O | Δ | X |
|  | 8 | 35 | 0.21 | 1.6 | O | O | Δ | −1.6 | 1.3 | X | O | X |
|  | 9 | 30 | — | — | — | O | O | −2.2 | 1.5 | O | Δ | — |
|  | 10 | 27 | — | — | — | O | O | −2.7 | 1.2 | O | Δ | — |

(*8): Dimensional accuracy
Same as the note (*1) to Table 1.
(*9): Flexibility
A rectangular parallelpipedal sample, 20 mm ×
40 mm × 300 mm, cut out from the molded article is bent,
and the angle of bending which causes breakage of the
sample is measured. The flexibility is evaluated as
follows:
O: Not broken even when the angle is at least
135°
Δ: Broken when the angle is at least 90°
and less than 135°
X: Broken when the angle is less than 90°
(*10): Surface condition
Evaluated as follows by the number of depressed
portions at least 2 mm deep from the surface per 50 mm ×
50 mm.
O: not more than 2
Δ: 3 to 5
X: 6 or more

TABLE 8-continued (*11): Dimensional change upon heating
Same as the note (*2) to Table 1.
(*12): Compression hardness
Same as the note (*3) to Table 1.
(*13): Surface protectability
The occurrence of injury on the surface of a
decorative sheet of a melamine resin or the like by
rubbing it with the molded particle was observed, and the
surface protectability is evaluated as follows:-
O: No injury
X: Injury occurred
(*14): Compression set
Measured in accordance with JIS K-6767, and
evaluated as follows:
O: less than 8%
Δ: 8 to 15%
X: more than 15%
(*15): Overall evaluation
O: excellent in regard to all of the above
properties
X: inferior in regard to at least one of the
above properties The results in the foregoing Examples demonstrate that the molded articles of the invention comprising the crosslinked ethylene/propylene random copolymers have excellent properties in regard to shrinkage, flexibility, surface condition, dimensional change upon heating, compression hardness, surface protectability, compression set, etc.

What is claimed is:

1. Prefoamed crosslinked propylene-type resin particles prepared by using as a base resin a propylene random copolymer composed of propylene and another olefin selected from the group consisting of ethylene, butene-1, pentene, hexene, octene and 4-methylpentene-1 and whose amount of heat of crystallization determined by a DSC method is 19 to 10 cal/g, said prefoamed particles having a gel fraction of 25 to 65%, said prefoamed particles also having an internal pressure decreasing speed coefficient, k, at 1 atmosphere which is represented by $k \leq 0.3$ (1/hr).

2. The prefoamed resin particles of claim 1 wherein the true expansion ratio of the particles represented by E and the average number of cells per $mm^2$ of cross section represented by n have the relation represented by the expression $2 < E^{\frac{1}{3}} \times n^{\frac{1}{2}} < 45$.

3. A molded article of a crosslinked propylene-type resin which is a fused aggregate of prefoamed crosslinked propylene resin particles prepared by using as a base resin a propylene random copolymer which is composed of 90 to 99% by weight of propylene and 10 to 1% by weight of another olefin selected from the group consisting of ethylene, butene-1, pentene, hexene, octene and 4-methylpentene-1 and whose amount of heat of crystallization is 19 to 10 cal/g, said fused aggregate having a gel fraction of 25 to 65%, and the number of cells in the aggregate represented by N per $mm^2$ and its density represented by d (g/cm$^3$) having the relation represented by the expression $2 < N^{\frac{1}{2}}/d^{\frac{1}{3}} < 45$.

4. The prefoamed resin particles of claim 1 wherein the propylene random copolymer is composed of 90 to 99% by weight of propylene and 10 to 1% by weight of said other olefin.

* * * * *